United States Patent [19]

Gregory et al.

[11] Patent Number: 5,623,383
[45] Date of Patent: Apr. 22, 1997

[54] MAGNETIC SLIDER DESIGN FOR PRECISION WEAR-IN

[75] Inventors: Thomas A. Gregory, Rochester, Minn.; Christopher G. Keller, Albany, Calif.

[73] Assignee: International Business Machines, Armonk, N.Y.

[21] Appl. No.: 269,869

[22] Filed: Jun. 30, 1994

[51] Int. Cl.⁶ .................................................. G11B 5/60
[52] U.S. Cl. ................................................... 360/103
[58] Field of Search ............................... 29/603, 603.01, 29/603.07, 603.13, 603.15, 603.16; 360/103–106

[56] References Cited

U.S. PATENT DOCUMENTS

| | | | |
|---|---|---|---|
| 4,445,188 | 4/1984 | Barrett | 364/550 |
| 4,510,541 | 4/1985 | Sasamoto | 360/97 |
| 4,692,832 | 9/1987 | Bandara et al. | 360/137 |
| 4,761,699 | 8/1988 | Ainslie et al. | 360/104 |
| 4,845,816 | 7/1989 | Nanis | 29/90.01 |
| 4,901,185 | 2/1990 | Kubo et al. | 360/104 |
| 5,118,577 | 6/1992 | Brar et al. | 360/103 |
| 5,278,711 | 1/1994 | Gregory et al. | 360/103 |

FOREIGN PATENT DOCUMENTS

| | | |
|---|---|---|
| 0105094 | 4/1984 | European Pat. Off. . |
| 0231625 | 8/1987 | European Pat. Off. . |
| 61-48182 | 3/1986 | Japan . |
| 63-149820 | 6/1988 | Japan .................................. 360/103 |
| 1211234 | 8/1989 | Japan . |
| 5-74090 | 3/1993 | Japan .................................. 360/103 |
| 6150601 | 5/1994 | Japan .................................. 360/103 |

*Primary Examiner*—Stuart S. Levy
*Assistant Examiner*—Allen Cao
*Attorney, Agent, or Firm*—Hugh D. Jaeger

[57] ABSTRACT

Method, with structure, of production of precision head/disk interfaces for near contact recording in a low viscosity liquid lubricant film. Triangular shaped bearing pads in an assembled hard drive are brought to bear upon a rotating lubricated disk to dislodge, smooth and polish any residing asperity. The triangular shape of the bearing pads sweeps away and directs to the outer edge of the disk any of the remaining fine carbon sputtering debris which is loosened as the bearing pads are drawn from the inner dimension to the outer dimension of the disk.

14 Claims, 6 Drawing Sheets

FIG. I

MAGNETIC SLIDER DESIGN FOR PRECISION WEAR-IN

BACKGROUND OF THE INVENTION

1. Technical Field—Field of the Invention

The present invention relates to sliders for magnetic disk storage drives, and more particularly, to a method and structure which provides a high precision accommodation of a slider with respect to a disk so that a narrow range of very low flying heights is attained.

2. Description of the Prior Art

Prior art techniques for improving the flying height tolerance have generally followed an approach independent of the relationship to actual flying height. It is well known to sweep a magnetic storage disk with a low flying slider to reduce the height and number of asperities. This approach is discussed in U.S. Pat. No. 4,510,541 and U.S. Pat. No. 4,445,188. The use of sliders to burnish the magnetic disk is taught in U.S. Pat. No. 4,845,816, European Patent 231,625 and Japanese Patent 1-211234. A "preconditioning" of a magnetic disk is suggested in U.S. Pat. No. 4,692,832.

SUMMARY OF THE INVENTION

In the system of this invention, the sliders are designed to have an initial flying height lower than ultimately desired. When the slider is first placed over the rotating magnetic disk, there is substantial contact with the asperities on the disk surface. This contact produces two effects. First, as in the case with prior art burnishing or preconditioning of magnetic disks, the asperities are worn down and swept away. An additional effect is the contact induced wear of the slider which causes the bearing area of the slider to increase. The slider wear and resulting increased bearing area causes the flying height to increase. While such an approach might cause catastrophic wear in some cases, this invention provides a disk surface which is flooded with lubricant to prevent such from occurring.

In the preferred embodiment, the disk storage system is provided with the smoothest disks that can be economically made. A recirculating disk lubricant system is used such as that described in the U.S. patent application Ser. No. 07/264,604, filed Oct. 31, 1988, "Apparatus and Method for Near Contact Magnetic Recording," by T. A. Gregory, C. G. Keller and T. S. Larson, and assigned to the assignee of this application. Beveled triangular shaped bearing pads are machined into the bottom surface of the slider, which confronts the disk surface. The slider is bonded onto a cantilever spring suspension which is mounted on the underside of a slider arm. After assembling the heads and lubricated disks into a drive, the disks are rotated at full operating speed while the actuator is slowly swept from the inside track to the outside track. During this process, disk asperities are worn away and, additionally, the slider is worn to provide a greater supporting surface such that it flies at a height greater than the remaining asperities. This is possible because of three factors: (1) the disk asperity population and maximum height is low; (2) the slider is designed so that the bearing area increases as the bearing pad wears; and, (3) the lubricant flooded condition provides a well controlled wear process such that it is not possible to go into a catastrophic wear regime.

According to one embodiment of the present invention, there is provided a slider having triangular shaped bearing pads to better accomplish the sweeping and clearing of debris from the surface of a disk.

One significant aspect and feature of the present invention is the use of bearing pads which are worn down as they wear away, polish and remove any asperities of a disk.

Another significant aspect and feature of the present invention is the incorporation of a bearing pad having a triangular shape or any other appropriate shape for angular sweeping of asperity produced debris from a disk surface.

A further significant aspect and feature of the present invention is a bearing pad having beveled sides.

Yet another significant aspect and feature of the present invention is the wearing of the bearing pads and the disk as an assembled unit.

Still another significant aspect and feature of the present invention is a bearing pad utilizing a wear-away surface.

Yet a further significant aspect and feature of the present invention is a bearing pad whose finished, worn-in surface, is larger than the pre-wear-in surface.

Having thus described one embodiment of the present invention, it is the principal object hereof to provide a method and structure for precision wear of a slider with respect to a disk so that a narrow range of low flying heights is provided.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 6A illustrates a side view of a slider and pads prior to disk wear in; and, FIG. 6B illustrates a side view of a slider and pads subsequent to disk wear-in.

DETAILED DESCRIPTION OF THE PREFERRED EMBODIMENTS

Figure 1:
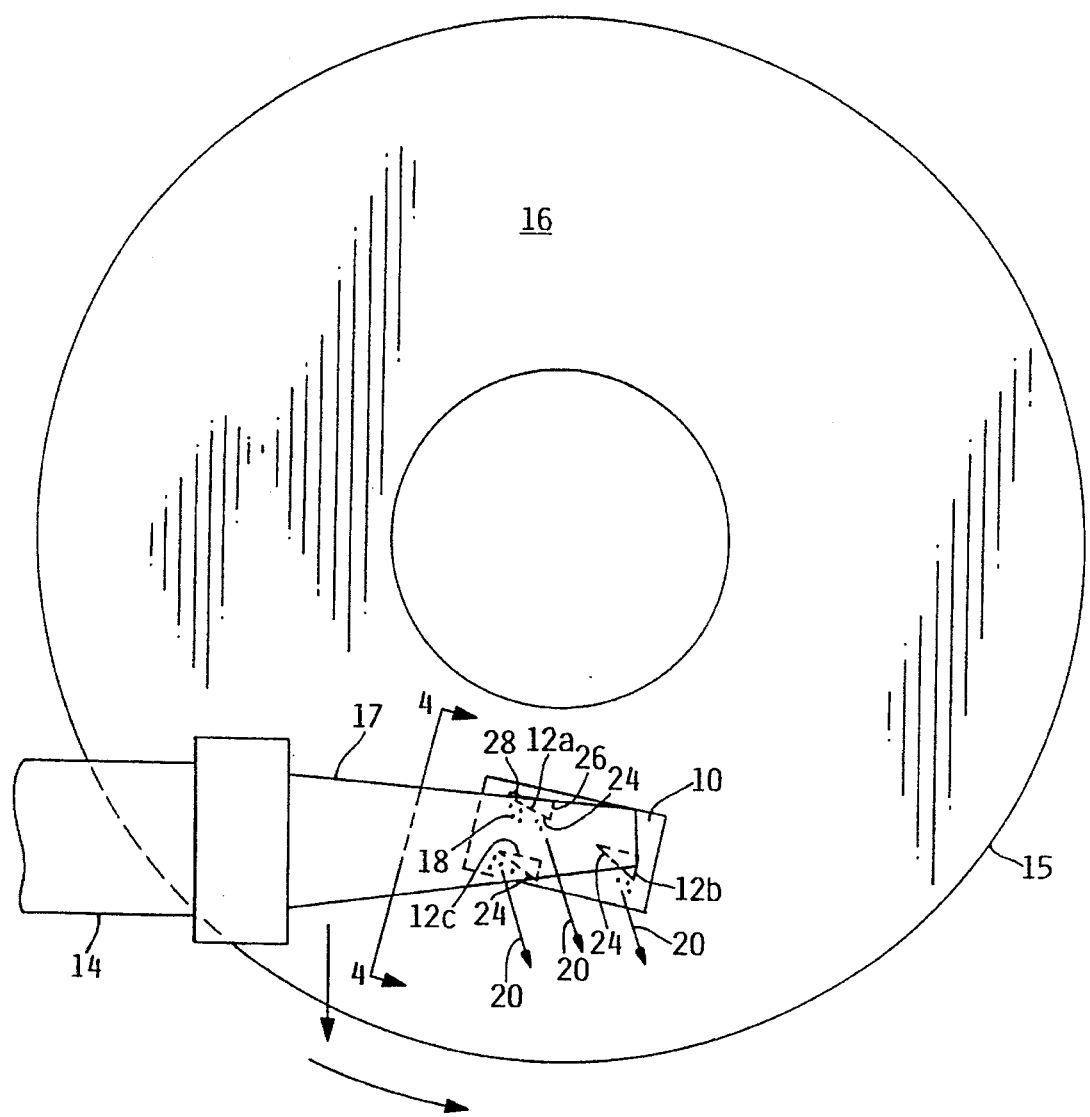
FIG. 1 illustrates a top view schematic view of the relationship of the slider and disk of the present invention.
Figure 2:
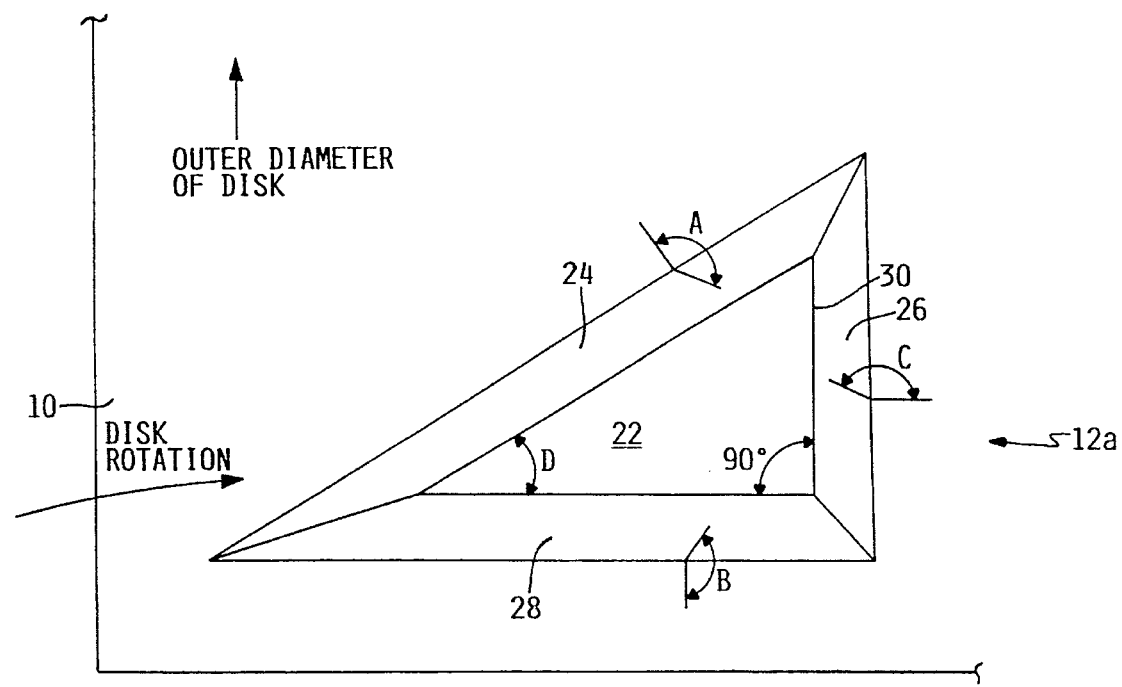
FIG. 2 illustrates a bottom view of a bearing pad.

FIG. 1 illustrates a slider body 10 including wearable bearing pads 12a, 12b and 12c of wear-resistant material, such as MnZn ferrite or titanium carbide alumina composite material, which may be coated with a thin layer of another material such as carbon, mounted on the underside of cantilevered spring suspension flexure 17. The bearing pads 12a, 12b and 12c have an overhead profile of a right triangle, with the hypotenuse positioned in the direction to face disk rotation and propel debris to the outer edge 15 of the disk. Each of the sides of the bearing pads 12a, 12b and 12c are beveled inwardly, as illustrated in FIG. 2, so that the surface area of the pads increases as the pads are worn down. The magnetic storage disk 16 is preferably a carbon over-coated sputtered thin film polished disk. The disk is covered with a lubricant, such as hexadecane. To produce the desired slider wear and disk surface conditioning, the disk storage system is first powered up, and the disk brought up to normal operating speed. Optionally, the disk can be sped up in excess of the normal disk operating speed to facilitate rapid wearing in of the bearing pads 12a–12c. At this time the actuator arm 14 with cantilevered spring suspension 17, having the slider body 10 with bearing pads 12a–12c mounted thereupon, is swept across the surface of the magnetic storage disk 16 from the innermost track to the outermost track, pausing over each track for a period of time sufficient to erode the remaining asperities and wear away an increment of the surface of the bearing pads 12a, 12b and 12c abutting the disk surface. Since the support area of the bearing pads 12a–12c is relatively small at the outset, frequent contact with disk asperities occurs and foreign matter on the surface of the disk comes into contact with the slider containing the bearing pads 12a–12c. The leading edges of the pads are at approximately 30 degrees to the movement of the disk surface, causing the dislodged asperities and other debris to be borne away to the outside of the disk surface where it eventually passes into the air to be captured by the filtration system associated with the disk storage system. The sweeping movement of the bearing pads 12a–12c in an outward direction from the center of the disk and the triangular shape of the bearing pads 12a–12c combine to convey foreign matter debris from the disk surface. Particulate debris 18 about the disk surface are generally transported away from the center as indicated by the direction of arrows 20.

The wear-in routine may be tailored to the particular head/disk/lubricant combination used. The fundamental requirement common to all wear-in algorithms is to wear away disk asperities and achieve final slider geometry as quickly as possible without going into a catastrophic wear regime. Also, it is necessary to ensure that the ID to OD sweep rate is slow enough to push all debris to the OD.

A typical routine would be to start the wear-in procedure with the slider at the ID, and move it radially outward at a rate of one data track per second while the disks are rotating at the normal operating speed. After reaching the OD, the slider is returned to the ID at a rate of 1000 tracks per second. This cycle is repeated until wear-in is complete.

Figure 5:
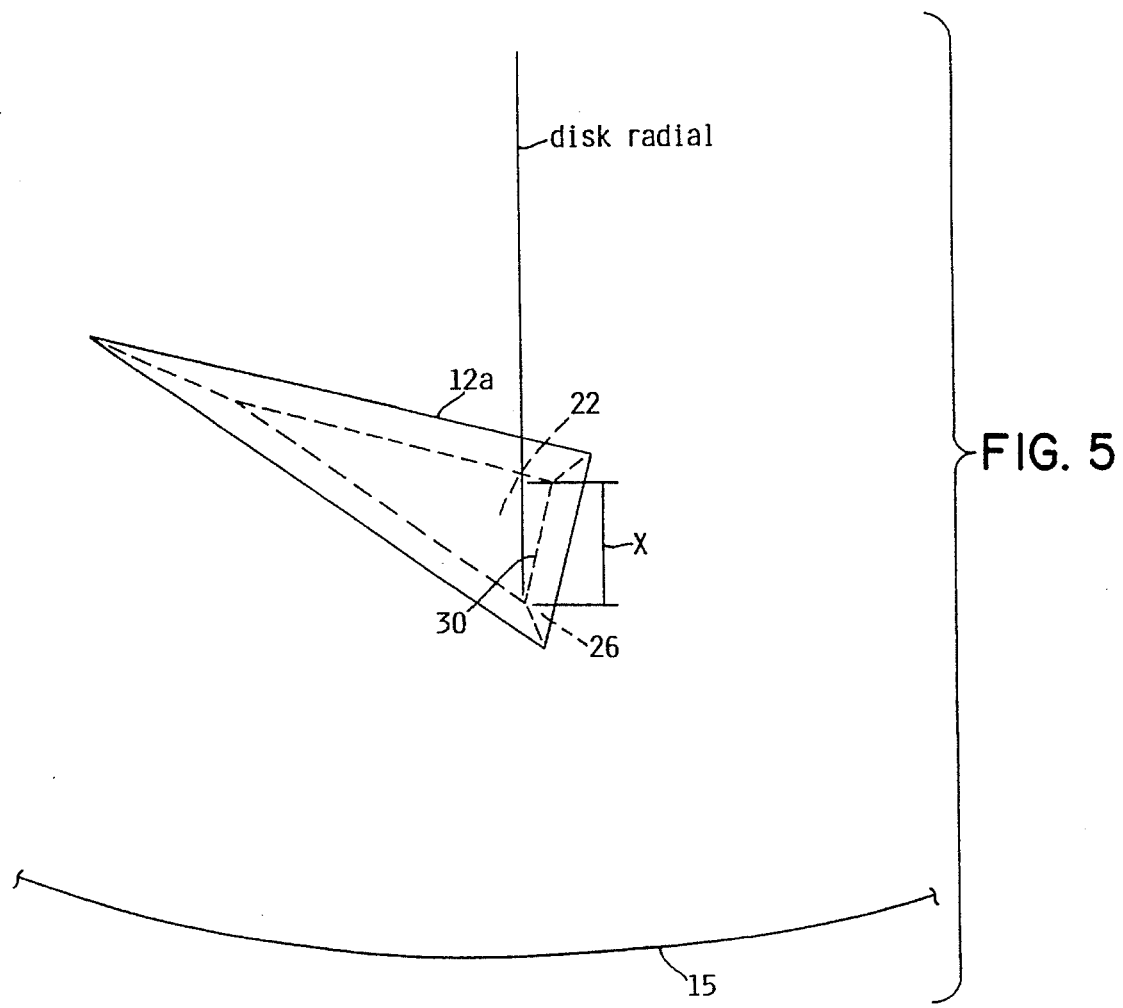
FIG. 5 illustrates the maximum radial displacement of a bearing pad for one disk revolution.

There is an infinite variety of sweeping algorithms that can be used. It is important that the slider (1) be moving from ID to OD, (2) be moving slowly enough that during the time it takes for the disk to rotate once, the slider move less than the width of one bearing pad thus providing full sweeping coverage. Otherwise, if the movement from ID to OD was too rapid, it would be possible for debris particles to pass between the sweeping feet without being swept to the OD. Maximum radial bearing pad displacement is illustrated in FIG. 5.

While the invention operates to further improve the quality of the disk surface, the magnetic storage disk 16 is ideally made molecularly smooth when microscopically inspected to a power of 1000×. All manufacturing lapping lines are polished and smoothed off during the disk manufacturing process prior to assembly of the drive system to provide for closer and more precise flying height at the outset.

As the process continues, the bearing pads 12a–12c receive benefit of intermittent sliding contact with the disk. Another benefit is that the end product bearing pad surface is made larger during the process. After initial wear-in is completed, no further change in slider dimensions or flying height can be detected.

The gap lengths and throat heights as manufactured are dimensioned so that they will be correct after the anticipated wear-in is done.

The most economical way to make precision tolerances is to do the last manufacturing step in the assembled device itself. This automatically provides the best flying height tolerances obtainable since the process is self-limiting when the desired condition is reached. Since the wear-in lapping is done at the suspension level, crown, camber and twist are all worn away leaving a more planar bearing than can be consistently made by the present practice of lapping the sliders before attaching them to the suspensions.

FIG. 2 illustrates a bottom view of a bearing pad 12a mounted on the slider 10 being in the shape of a truncated pyramid, having a horizontally oriented planar wear surface 22 and beveled side surfaces 24, 26, and 28 intersecting planar wear surface 22, which is in the shape of a right triangle. The base of the bearing pad 12a is suitably secured to the slider 10. Bevel surface 24 can be angled from 90° to 135° (angle A) with respect to the plane of the slider 10. Surface 24 adjacent to the hypotenuse of the planar wear surface 22 is responsible for sweeping of debris from the surface of the magnetic storage disk 16, and is angled for purposes of illustration only at 30° with respect to the tangent line of the magnetic storage disk 16. Bevel side surface 28 can be at an angle of 170° to 110°, (angle B), and the trailing surface 26 can be at an angle of 170° to 110°, (angle C), with respect to the plane of the slider 10. The plane of the slider is essentially parallel to the disk surface. Angle D, the angle between bevel surfaces 24 and 28 is measured on the triangular surface 22, can be at an angle of 10° to 45°.

With reference to FIG. 1, it is noted that the slider body 10, to which the bearing pads 12a–12c are secured, is skewed so that all radial positions of the rotating disk 16 encounter the planar surface 24 first before any of the remaining angled surfaces 28 or 26 of each pads 12a–12c. This skewing angle is the difference between the transverse axis of the slider body 10 and the disk radial line. This skewing insures that the surface 24, and surface 24 only, is the surface which provides for a sweeping away action of debris particles toward the outer edge of the disk 16. It is also noted that for the purpose of proper sweeping, that the skew angle of the slider body 10 is such that at all times, for each of the bearing pads 12a–12c, the angle of the radial line that goes through the leading vertex of the pads and the side of the pads that face the inner diameter of the disk 16 is greater than 90°.

Figure 3:
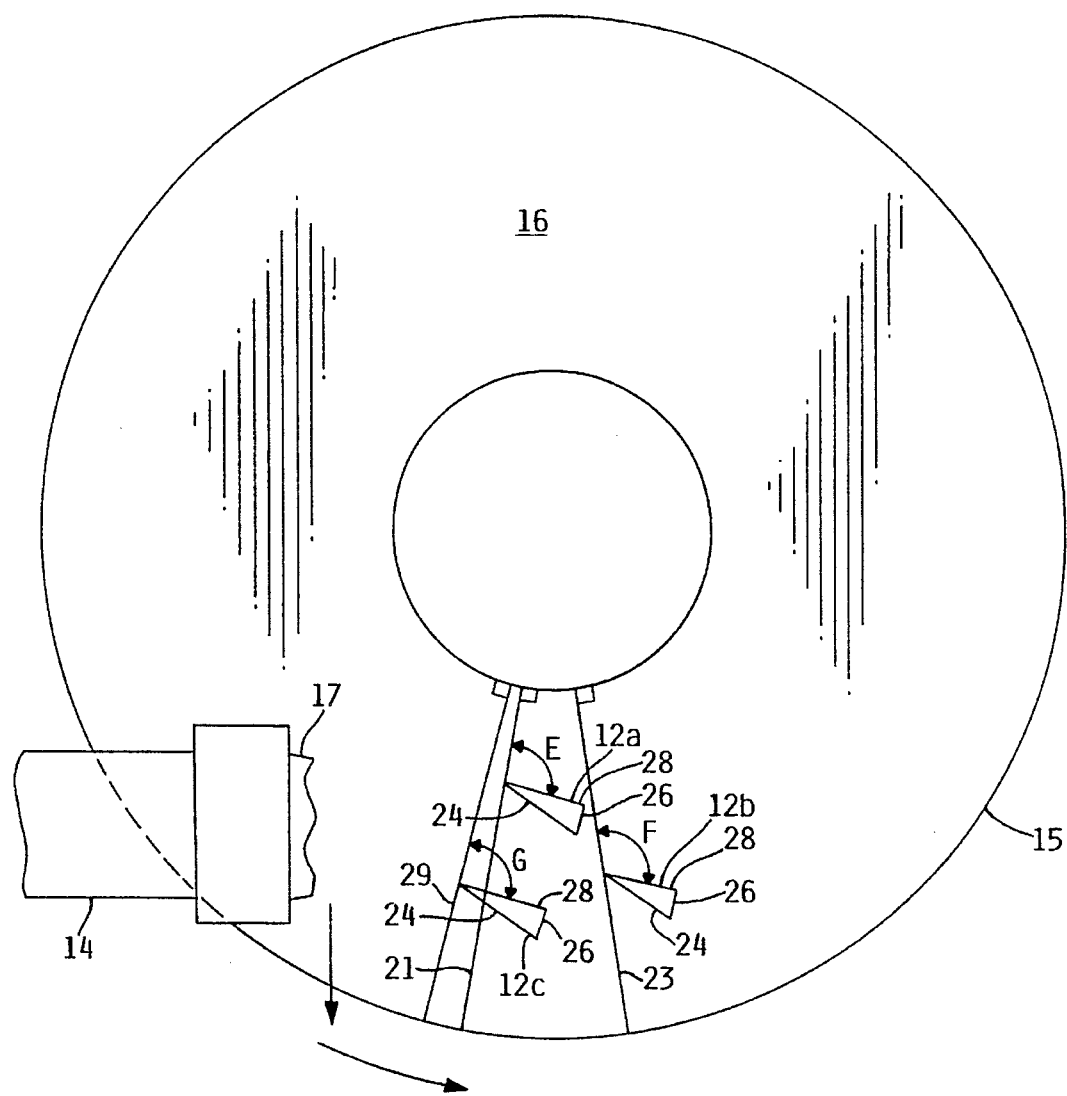
FIG. 3 illustrates the properly skewed alignment of the pads.

FIG. 3 illustrates the properly skewed alignment of the pads 12a–12c with respect to radial lines 21, 23 and 29 where all numerals correspond to those elements previously described. Radial lines 21 and 29 go through the leading vertex of the pads 12a and 12c, respectively, and where radial line 23 goes through the leading vertex of pad 12b. In each case, angles E, F, and G, are angles which are greater than 90°. This insures that any debris on the disk surface will not be swept toward the inner diameter of the disk 16 by the beveled surface 28.

Figure 4:
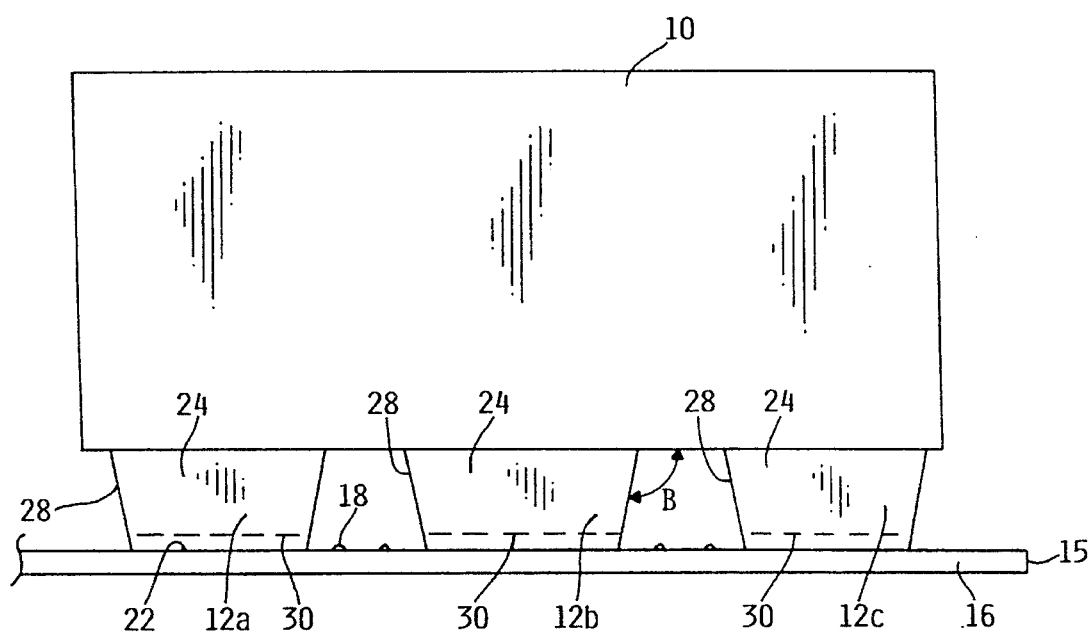
FIG. 4 illustrates a side view along line 4—4 of FIG. 1.

FIG. 4 illustrates a side view of the present invention along line 4—4 of FIG. 1 where all numerals correspond to those elements previously described. Illustrated in particular are beveled edges 28 and 24 of the bearing pads 12a–12c and the wear away zone beneath the dashed lines 30.

FIG. 5 shows the distance X which is the maximum distance which the slider pads may be moved during a single disk revolution. Moving the slider a greater distance may result in an incomplete scavenging of debris from the disk surface.

Figure 6A:
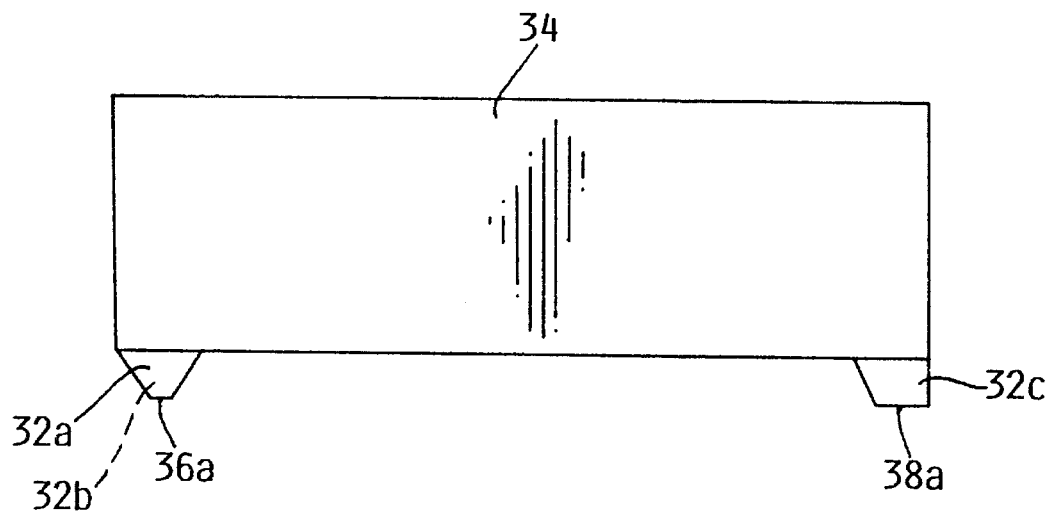
Figure 6B:
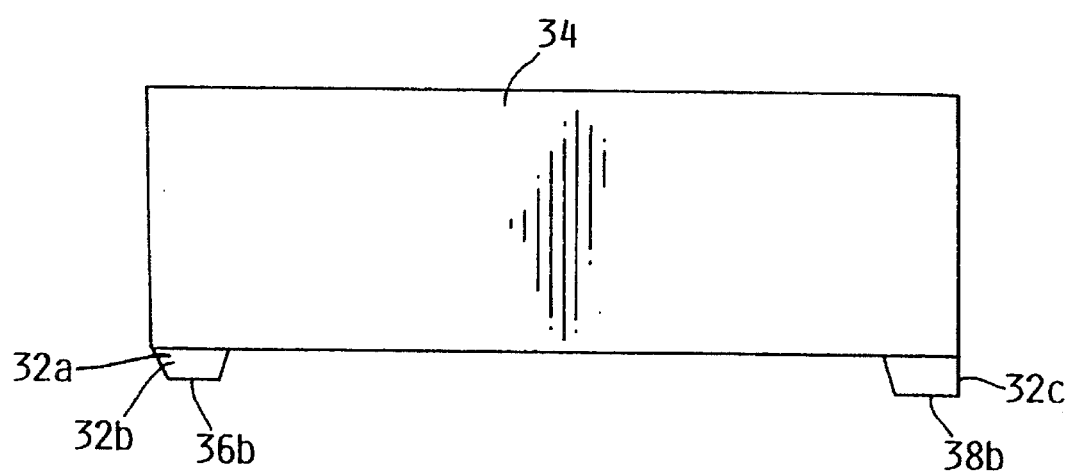

FIGS. 6A and 6B illustrate the incorporation of non-transducer bearing pads as the primary tool for use in wearing down of asperities on magnetic disks. A pair of leading, non-transducer, bearing pads 32a and 32b are positioned at the leading edge of a slider body 34, and a transducer bearing pad 32c mounts on the trailing edge of a slider body 34.

Wear occurs predominantly with non-transducer bearing pads 32a and 32b while wear on the transducer bearing pad 32c is minimal. FIG. 6A illustrates the non-transducer bearing pads 32a and 32b each having small footprint bearing surfaces 36a whereas the transducer bearing pad 32c has a relatively large footprint wearing surface 38a. FIG. 6B illustrates the bearing pads 32a, 32b and 32c subsequent to disk wear in. As pressure is applied to the slider 34, equal force is applied downwardly through the bearing pads 32a–32c. The non-transducer pads 32a–32b having a smaller footprint 36a are subject to greater pressure and consequently are worn down more than the transducer pad 32c having a larger footprint surface 38a which is less susceptible to surface wear during the wear-in process due to distribution of pressure across the relatively large surface footprint area 38a. The result is shown in FIG. 6B where the footprint of 38a of the transducer 32c of FIG. 6A increases ever so slightly as indicated by footprint 38b while the initial footprint 36a of the non-transducer pads 32a and 32b are worn down significantly to a relatively large footprint 36b.

The amount of wear-in that can be tolerated by the transducer 32c, before its magnetically important dimensions change significantly is smaller than the amount of wear that can be tolerated by the leading pads (non-transducer bearing) 32a and 32d.

Therefore, by making the initial bearing area of the non-transducer carrying pads 32a and 32b undersized by a larger percentage than the transducer-carrying pad, more disk asperities can be worn off the disk surface without significantly changing the dimensions the transducer 32c.

The initial bearing area cannot be so small that the resulting contact pressure with the disk is high enough to cause the system to go into a catastrophic wear regime.

Exact dimensions depend on the particular slider, disk and lubricant used, in addition to many other factors peculiar to any particular disk drive design. A typical strategy would be to design the initial bearing areas such that after wear-in is complete, the transducer bearing pad has worn 0.1 micrometers or less (in the direction perpendicular to the disk surface), and the non-transducer carrying pads have worn 2 micrometers or less.

At intervals during the normal use of the disk drive, the sliders are slowly moved from ID to OD and back to ID to keep the entire accessible area clean.

The as-manufactured bearing area of the transducer-bearing pad may be a larger percentage of its final worn-in area than the non-transducer bearing pads. For example, the non-transducer bearing pads may initially be 50% of their ultimate area while the transducer bearing pad may be 99% of its final area. That way most of the task of wearing away disk asperities is done by the non-transducer bearing pads. The transducer bearing pad which has the additional constraint of having to maintain correct transducer dimensions is not much affected.

Various modifications can be made to the present invention without departing from the apparent scope hereof.

We claim:

1. The method of adapting, after assembly, the head-disk interface, in a magnetic disk storage system utilizing at least one hard disk, said hard disk including a plurality of tracks, including inner tracks and outer tracks, said method to provide an increased head disk spacing and a smoother disk surface comprising the steps of:

a. positioning an actuator arm supporting a slider over the inner tracks while rotating a heavily lubricated hard disk at a normal operating speed, each of said slider having a plurality of support pads including leading edges positioned at an angle facing outwardly relative to said plurality of tracks, and having inwardly beveled sides terminating in a disk facing surface having an area at a first time;

b. holding said actuator arm over a given track for a period of time sufficient to erode the remaining asperities from said disk surface and displace debris from said eroded asperities outwardly toward the outer tracks of the disk; and c. successively positioning said actuator arm over tracks in ascending order from the innermost track of said plurality of tracks to the outermost track of said plurality of tracks while rotating said disk at normal operating speed to remove asperities from the tracks on the disk and to produce a disk facing surface having an area at a second time which is greater than the disk facing surface at the first time; and d. reading and writing information to selected tracks of said plurality of tracks with said slider which includes a transducer.

2. A method according to claim 1 wherein the angle of the leading edges of said slider support pads relative to the rotational movement of said disk surface is 10 to 45 degrees.

3. A method according to claim 2 wherein the beveled sides are angled with respect to the leading edge of said slider support pads to form a nominal bevel angle of 90to 135 degrees.

4. A method according to claim 3 wherein the nominal bevel angle of the leading edge of said slider support pads is smaller than the nominal bevel angle of the other edges of said support pads.

5. A method according to claim 4 wherein the nominal bevel angle of the other sides of said slider support pads is 170 to 100 degrees.

6. A method according to claim 1 wherein said slider includes 3 support pads.

7. A method according to claim 1 wherein the disk facing surface of said slider support pads has the area at said first time which is not more than 95% of the disk facing surface area of said slider support pads at said second time.

8. A method according to claim 1 wherein step b is performed for 0.1 to 10 seconds on each data track.

9. A method according to claim 1 wherein said disk is lubricated with hexadecane in a layer less than 5 microns thick.

10. A method according to claim 1 wherein a time between said first and second times is allocated equally among all the disk tracks.

11. A method according to claim 1 wherein a portion of time between said first and second times for head disk interface break-in allocated to said inner tracks is greater than the portion of total time allocated to said outer tracks.

12. A method according to claim 1 wherein the portion of time between said first and second times allocated for break-in of individual tracks is progressively said increased from innermost to outermost track.

13. The method of claim 7 wherein the disk facing surface area at the second time is at a time after wear-in.

14. The method of claim 1 wherein the disk facing surface area at the second time is sufficient to maintain a spacing between the pad and the disk facing surface area.

* * * * *